United States Patent
Chang

(10) Patent No.: US 8,011,788 B2
(45) Date of Patent: Sep. 6, 2011

(54) ILLUMINATION SYSTEM ADAPTED FOR A PROJECTION APPARATUS AND COOLING AIR GUIDING APPARATUS THEREOF

(75) Inventor: Hsiu-Ming Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 652 days.

(21) Appl. No.: 12/112,365

(22) Filed: Apr. 30, 2008

(65) Prior Publication Data

US 2009/0027626 A1 Jan. 29, 2009

(30) Foreign Application Priority Data

Jul. 25, 2007 (TW) ................................ 96127145 A

(51) Int. Cl.
*G03B 21/16* (2006.01)
(52) U.S. Cl. ............. 353/52; 353/57; 353/58; 353/61; 353/85; 353/86; 353/87; 353/119; 353/122; 362/264; 362/294; 362/304; 362/346; 362/516; 362/518; 313/45; 313/46
(58) Field of Classification Search .............. 353/52, 353/57, 58, 60, 61, 85, 86, 87, 119, 122; 362/373, 96, 264, 294, 304, 346, 516, 518; 313/45, 46
See application file for complete search history.

(56) References Cited

U.S. PATENT DOCUMENTS

| | | | |
|---|---|---|---|
| 6,280,038 B1 * | 8/2001 | Fuse et al. ...................... 353/57 |
| 6,283,614 B1 * | 9/2001 | Okada et al. ................... 362/294 |
| 6,733,157 B1 * | 5/2004 | Shyu et al. .................... 362/294 |
| 6,742,899 B1 * | 6/2004 | Wu et al. ......................... 353/61 |
| 6,759,793 B2 * | 7/2004 | Narita ............................. 313/13 |
| 7,063,423 B2 * | 6/2006 | Fujimori et al. ................ 353/55 |
| 7,182,468 B1 * | 2/2007 | Haven ............................ 353/94 |
| 7,182,485 B2 * | 2/2007 | Chen et al. .................... 362/345 |
| 7,293,878 B2 * | 11/2007 | Morita et al. .................. 353/57 |
| 2001/0021006 A1 * | 9/2001 | Shimizu ......................... 353/57 |
| 2002/0182053 A1 * | 12/2002 | Miyazawa ..................... 415/77 |
| 2003/0086271 A1 * | 5/2003 | Masuoka et al. ............. 362/345 |
| 2009/0027890 A1 * | 1/2009 | Melzner ........................ 362/294 |

\* cited by examiner

*Primary Examiner* — Georgia Y Epps
*Assistant Examiner* — Sultan Chowdhury
(74) *Attorney, Agent, or Firm* — Grossman, Tucker, Perreault & Pfleger, PLLC

(57) ABSTRACT

An illumination system adapted for a projection apparatus is provided. The illumination system comprises a cooling air guiding apparatus, a lamp, and a cooling fan. The cooling air guiding apparatus comprises an air intake device and an adjustment device, while the adjustment device comprises an air-flow adjustment element and an air-flow guiding element. The cooling fan generates a cooling air, which flows from the exterior through the air intake device into the air-flow adjustment element. The air-flow guiding element guides the cooling air in the air-flow adjustment element out of an air-flow adjustment hole towards a specific direction. Since the adjustment device may move relatively to the air intake device, the air-flow adjustment hole is adapted to move from the first position substantially aligned with the opening to the second position constituting a substantial displacement with respect to the opening. The cooling air can cool the lamp no matter what angle the projection apparatus is disposed. As a result, the projection apparatus is allowed to be installed in any desired orientation without restrictions.

18 Claims, 14 Drawing Sheets

ILLUMINATION SYSTEM ADAPTED FOR A PROJECTION APPARATUS AND COOLING AIR GUIDING APPARATUS THEREOF

This application claims priority to Taiwan Patent Application No. 096127145 filed on Jul. 25, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a cooling air guiding apparatus, and particularly relates to a cooling air guiding apparatus for cooling a lamp in a projection apparatus.

2. Descriptions of the Related Art

Projection apparatuses are widely used for meetings, entertainment and studying activities. To meet the various needs of users, projection apparatuses often need to be installed in different locations and orientations. For example, a projection apparatus that is used in a meeting room or a classroom is typically suspended from the ceiling upside down, which may dispense with bothers of removing the projection apparatus and further save available spaces on the ground. However, because hot air always rise upwards, the temperature of the space above the lamp of the projection apparatus will go higher than that of the space below the lamp during operation. Once the temperature difference gets excessively large, the lamp may burst. As a result, projection apparatuses currently available adopt a side-air-intake design to cool the lamp in expectation of lowering the temperature difference in the vertical direction.

However, as shown in FIG. 1, a projection apparatus 1 often needs to be installed in a non-horizontal orientation to adapt to the concrete circumstances. For instance, when the target position of the projected images needs to be elevated and it is difficult to move the projection apparatus 1 backwards, an elevated angle between the projection direction of the lens 11 and a level flat of the projection apparatus 1 may be adjusted to be slightly higher so that the images are projected at the elevated angle θ. As a result, even though the opening position where a cooling air flow 10 flows into the lamp remains unchanged, the path of the cooling air flow 10 moves downwards, with most of the cooling air flow 10 passing the lower portion of the lamp 13. Consequently, the heat accumulating on the upper portion of the lamp 13 can degrade the performance as well as lead to the premature failure of the lamp 13. This imposes a great restriction on the installation orientation of the projection apparatus.

To avoid the excessively large temperature difference and high heat accumulation at some installation orientations, a great restriction is imposed on the installation orientations of projection apparatuses. On the other hand, if the projection apparatus is installed in an undesired orientation, it further affects the normal heat dissipation for other elements adjacent to the lamp. To solve this problem, manufacturers have proposed a cooling structure 2 for cooling the lamp 20 by changing the air flowing direction and the flow rate of a cooling air flow to appropriately dissipate the heat generated by the lamp 20. A cross-sectional view of the cooling structure 2 is depicted in FIG. 2A.

The cooling structure 2 has a cooling fan 21, an opening 23, a pair of air guiding passages 25 and a movable baffle 27. An upper end of the movable baffle 27 is disposed at the opening 23 with a pivot 271, so that a cooling air flow generated by the fan 21 and entering the opening 23 is separated into a left and a right air flow before going into the air guiding passages 25. The air guiding passages 25 are disposed on both sides of a lamp shade 201 respectively, so that the cooling air can flow towards a lamp wick 203 along an interior side of the lamp shade 201 and carry the heat generated by the lamp wick 203 outwards.

Generally, the light exits the lamp 20 in a direction perpendicular to the projection direction 22. Therefore, when the projection apparatus is tilted upwards or downwards at an elevated angle between the projection direction 22 of the lens and the level flat, the movable baffle 27 will be slanted to the left or to the right due to the gravity thereof, which may lead to an unequal cooling air flow on both sides. For example, as shown in FIG. 2B, if the projection apparatus is tilted upwards at the elevated angle between the projection direction 22 of the lens and the level flat, a lower side of the movable baffle 27 is slanted to the right to cause a large intake flow at the left opening 23a than that at the right opening 23b. In this case, the two air guiding passages 25 corresponding to the left opening 23a and the right opening 23b also have their locations moved upwards and downwards respectively. The larger cooling air flow passes the upwards displaced air guiding passage 25 into the lamp 20, while the smaller one passes the downwards displaced air guiding passage 25 into the lamp 20 for cooling. Due to the rising hot air, the space above the lamp 20 is cooled by a larger air flow, thus obtaining a more significant cooling effect.

In this structure, the orientation of the rotatably movable baffle 27 can be changed under the action of the gravity to adjust the cooling air flow, however, the cooling air from the fan 21 can affect the stationary status of the movable baffle 27 when the projection apparatus is fixed in a certain orientation, causing the continuous swaying of the movable baffle 27. As a consequence, it is difficult to correctly control the cooling effect on the lamp 20 under the various orientations of the projection apparatus.

In summary, because the cooling scheme of prior art lamps has not been perfected yet, a restriction is imposed on the installation orientation of the projection apparatus, making it difficult to dispose the projection apparatus in an optimum orientation. In other words, the user is not allowed to install the projection apparatuses in any orientation as desired. Furthermore, because the aforesaid cooling scheme has dual cooling air passages plus a movable baffle, it is difficult to correctly control the cooling air flow due to the swaying of the baffle under action of the air flow.

In view of this, it is highly desirable in the art to provide a cooling air guiding apparatus that can overcome the above disadvantages and to also provide a projection apparatus with such a cooling air guiding apparatus.

SUMMARY OF THE INVENTION

One objective of this invention is to provide a cooling air guiding apparatus adapted for a projection apparatus. The cooling air guiding apparatus comprises an air intake device and an adjustment device. The air intake device has a body. The body defines an inner air chamber and is provided with an opening disposed at a side of the body for communicating an exterior with the inner air chamber. The body is provided with a mounting hole formed at a vertical sidewall of the body. The adjustment device has an air-flow adjustment element and an air-flow guiding element. The air-flow adjustment element extends from the mounting hole into the inner air chamber and is formed with an air-flow adjustment hole. The air-flow guiding element extends outwards from the mounting hole for guiding air in the air-flow adjustment element towards a specific direction. The adjustment device is adapted to move relatively to the air intake device, such that the air-flow adjustment hole is adapted to move from a first position substantially aligned with the opening to a second position constituting a substantial displacement with respect to the opening.

Another objective of this invention is to provide an illumination system adapted for a projection apparatus. The illumination system comprises the following components: a cooling air guiding apparatus defined above, a lamp and a cooling fan. The lamp has a lamp wick and a lamp shade annularly disposed around the lamp wick, with a front edge of the lamp shade corresponding to the air-flow guiding element. The cooling fan is adapted to guide a cooling air flow from the opening of the body into the inner air chamber. The cooling air flow passes through the air-flow adjustment hole of the air-flow adjustment element into the adjustment device and is guided outwards from the air-flow guiding element.

By using the adjustable cooling air guiding apparatus of this invention, the cooling air generated by the cooling fan in the projection apparatus can be guided into an appropriate direction to cool the lamp. As a result, the projection apparatus is allowed to be installed in any desired orientation without being restricted by concrete occasions and locations.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
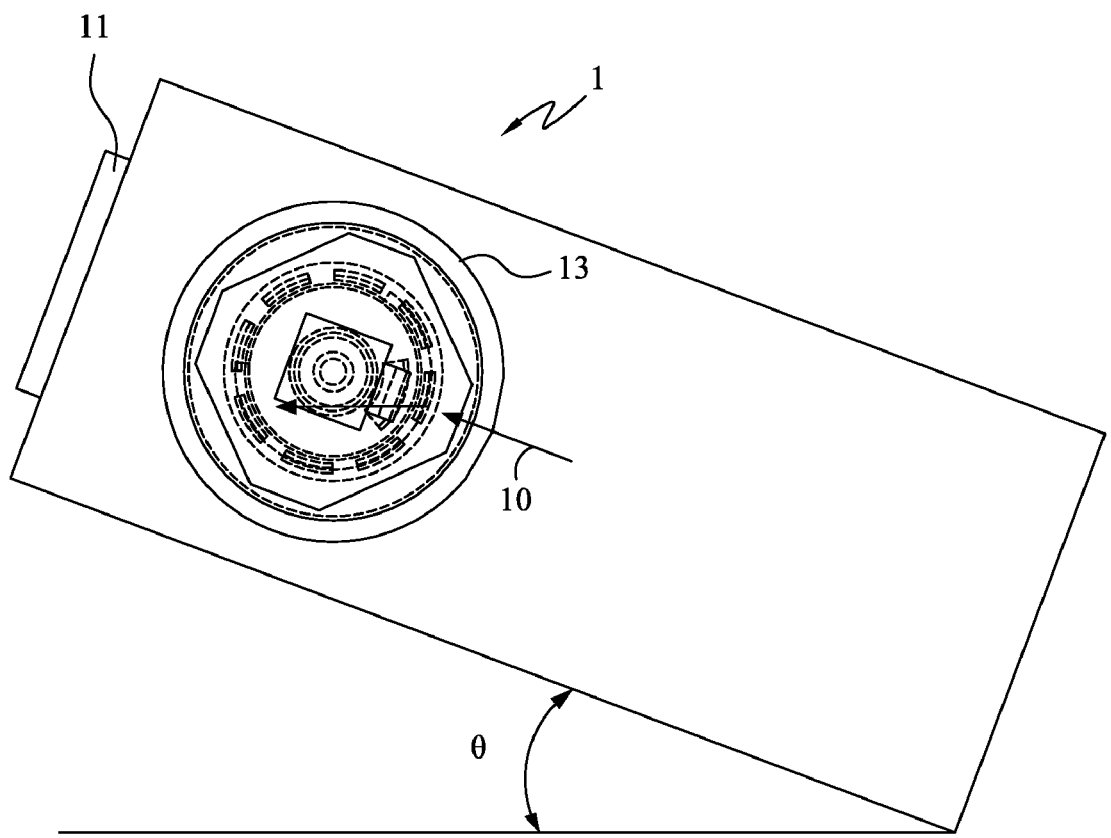
FIG. 1 illustrates a projection apparatus of the prior art that is installed at an elevation angle.
Figure 2A:
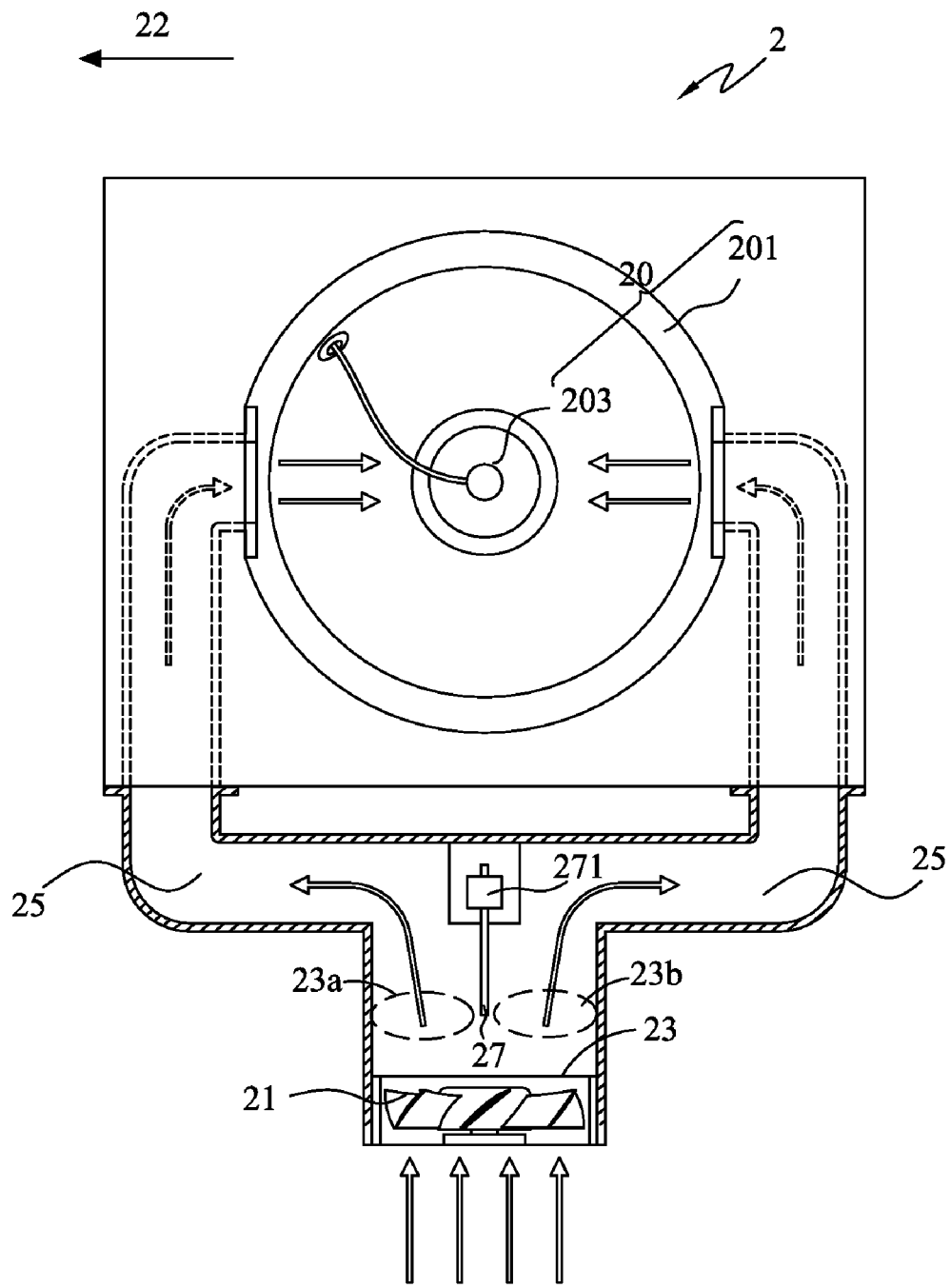
FIG. 2A is a cross-sectional view of a cooling structure of the prior art.
Figure 2B:
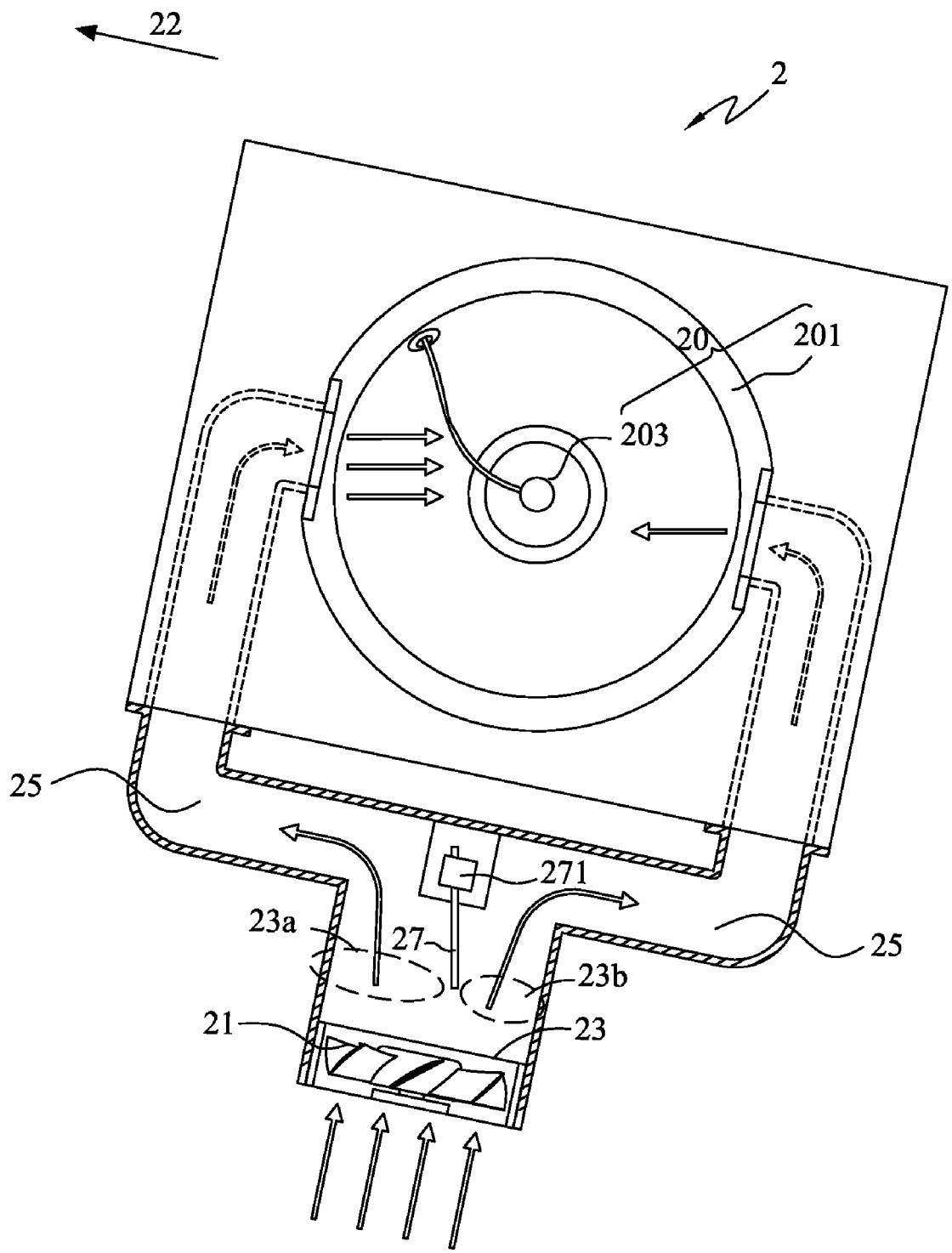
FIG. 2B is a cross-sectional view of a projection apparatus with the prior art cooling structure shown in FIG. 2A when installed at an elevation angle.
Figure 3:
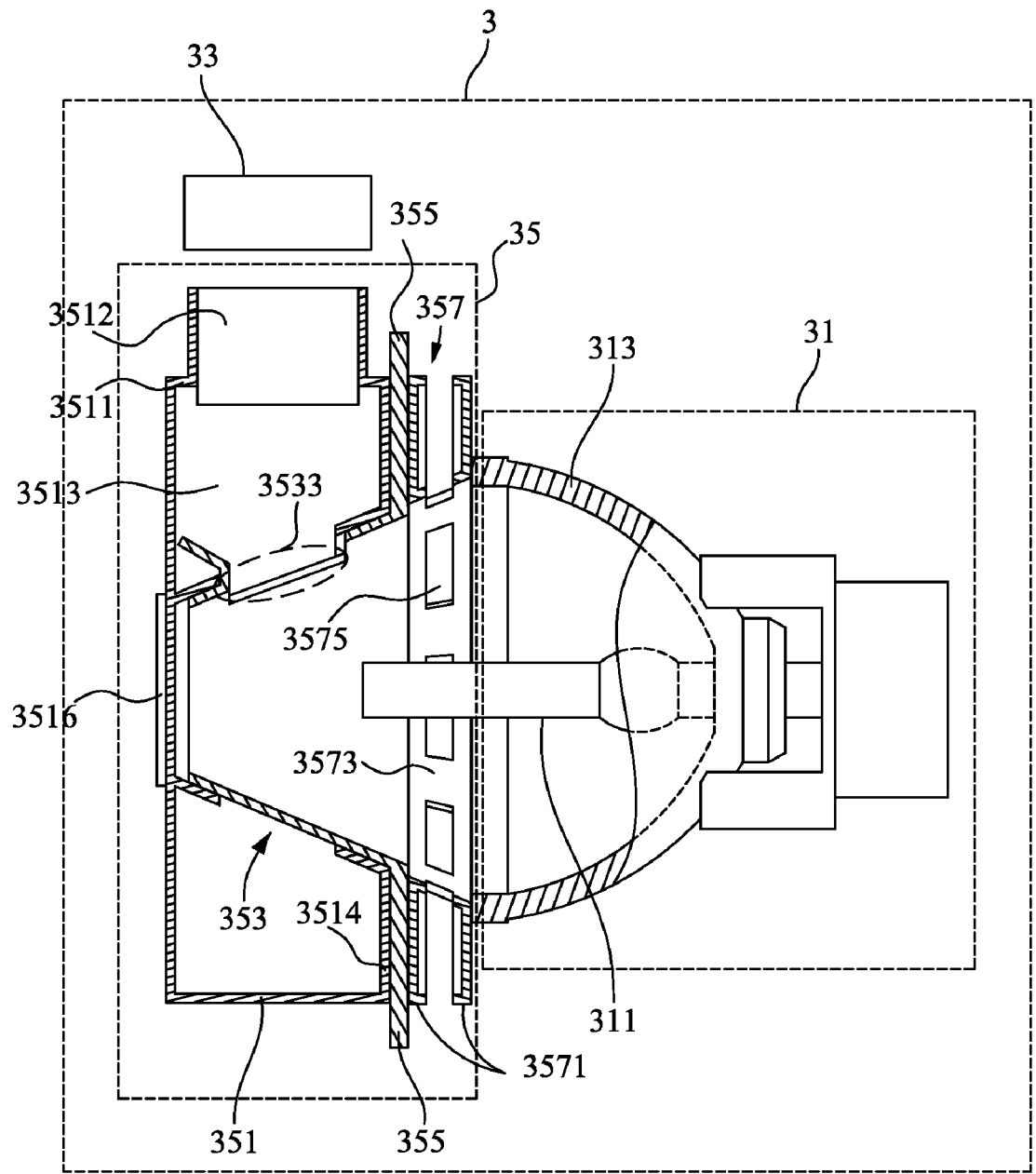
FIG. 3 is a side view of an illumination system of a preferred embodiment of this invention.

A preferred embodiment of this invention is an illumination system 3 for use in a projection apparatus, a cross-sectional view of which is depicted in FIG. 3. The illumination system 3 comprises a lamp 31, a cooling fan 33 and a cooling air guiding apparatus 35. The lamp 31 has a lamp wick 311 and a lamp shade 313. The cooling air guiding apparatus 35 has an air intake device 351, an adjustment device 353, an adjustment plate 355 and a receiving device 357. Also shown in FIGS. 4A and 4B, the air intake device 351 has a body 3511, an opening 3512, an inner air chamber 3513, a vertical sidewall 3514, a mounting hole 3515 and a projection lens 3516. The adjustment device 353 has an air-flow adjustment element 3531 and an air-flow guiding element 3532.

As can be seen from FIG. 3, the lamp shade 313 of the lamp 31 is annularly disposed around the lamp wick 311. The lamp shade 313 is coated with a reflective material on an inner surface thereof to form a reflective surface to reflect and guide the light emitted from the lamp wick 311. After passing through the cooling air guiding apparatus 35 which is hollow in a central portion thereof, the light is transmitted outwards through the projection lens 3516 of the air intake device 351. Since the lamp wick 311 generates heat during operation, it is necessary to dissipate the heat by guiding the cooling air through the cooling air guiding apparatus 35. A front edge of the lamp shade 313 is exactly corresponding to the air-flow guiding element 3532 of the cooling air guiding apparatus 35 to receive the cooling air guided by the cooling air guiding apparatus 35. In this embodiment, the lamp 31 is an ellipsoid lamp, i.e., an inner surface of the lamp shade 313 is a semi-ellipsoidal reflecting surface, and the lamp wick 311 is adapted to be located at the middle portion of the lamp 31 seen as FIG. 3.

The air intake device 351, the adjustment device 353, the adjustment plate 355, and the receiving device 357 included in the cooling air guiding apparatus 35 are depicted in FIGS. 4A and 4B, FIGS. 5A and 5B, and FIGS. 6A and 6B in cross-sectional views and perspective views respectively.

Figure 4A:
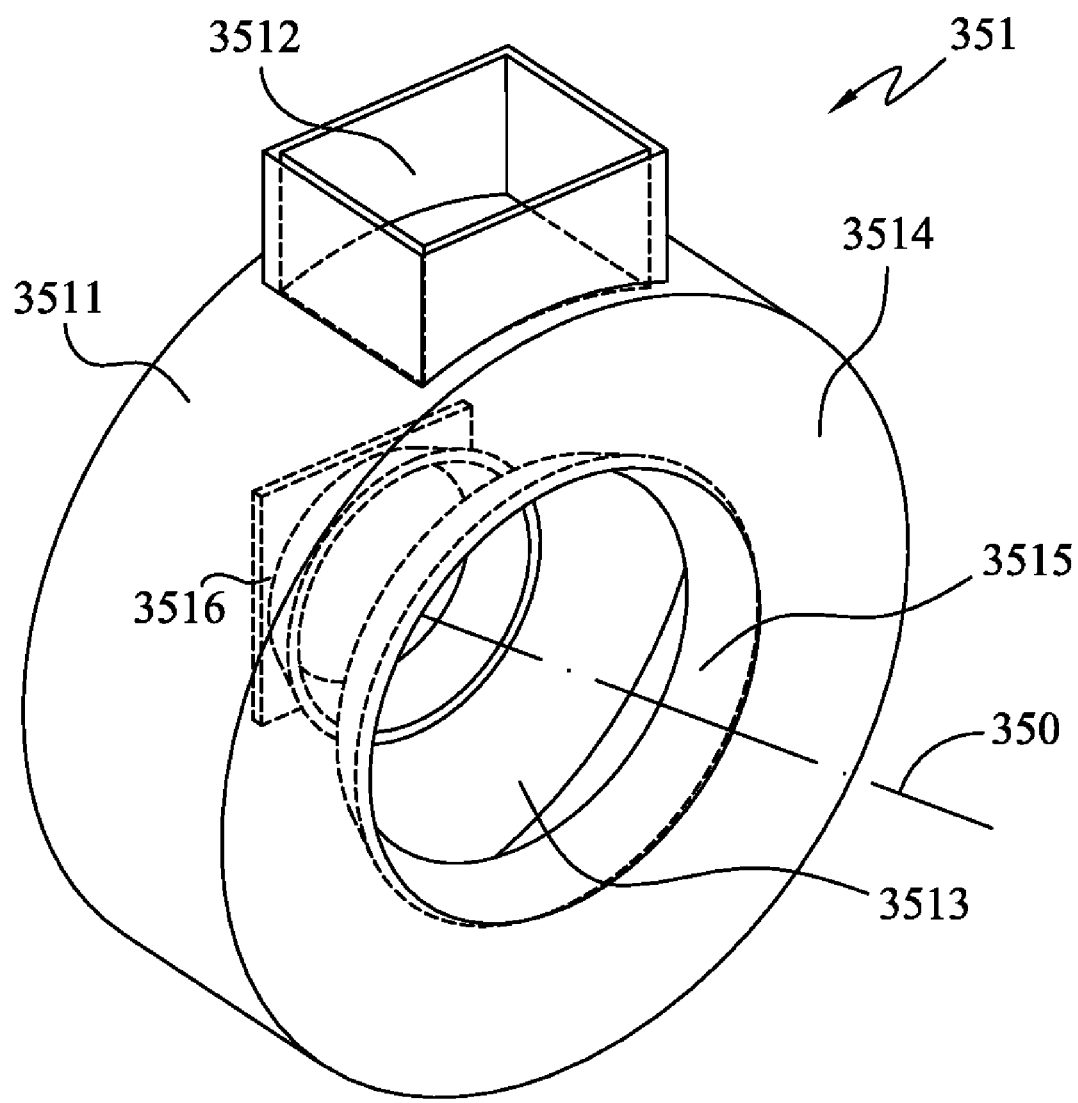
FIG. 4A is a perspective view of an air intake device of a preferred embodiment of this invention.
Figure 4B:
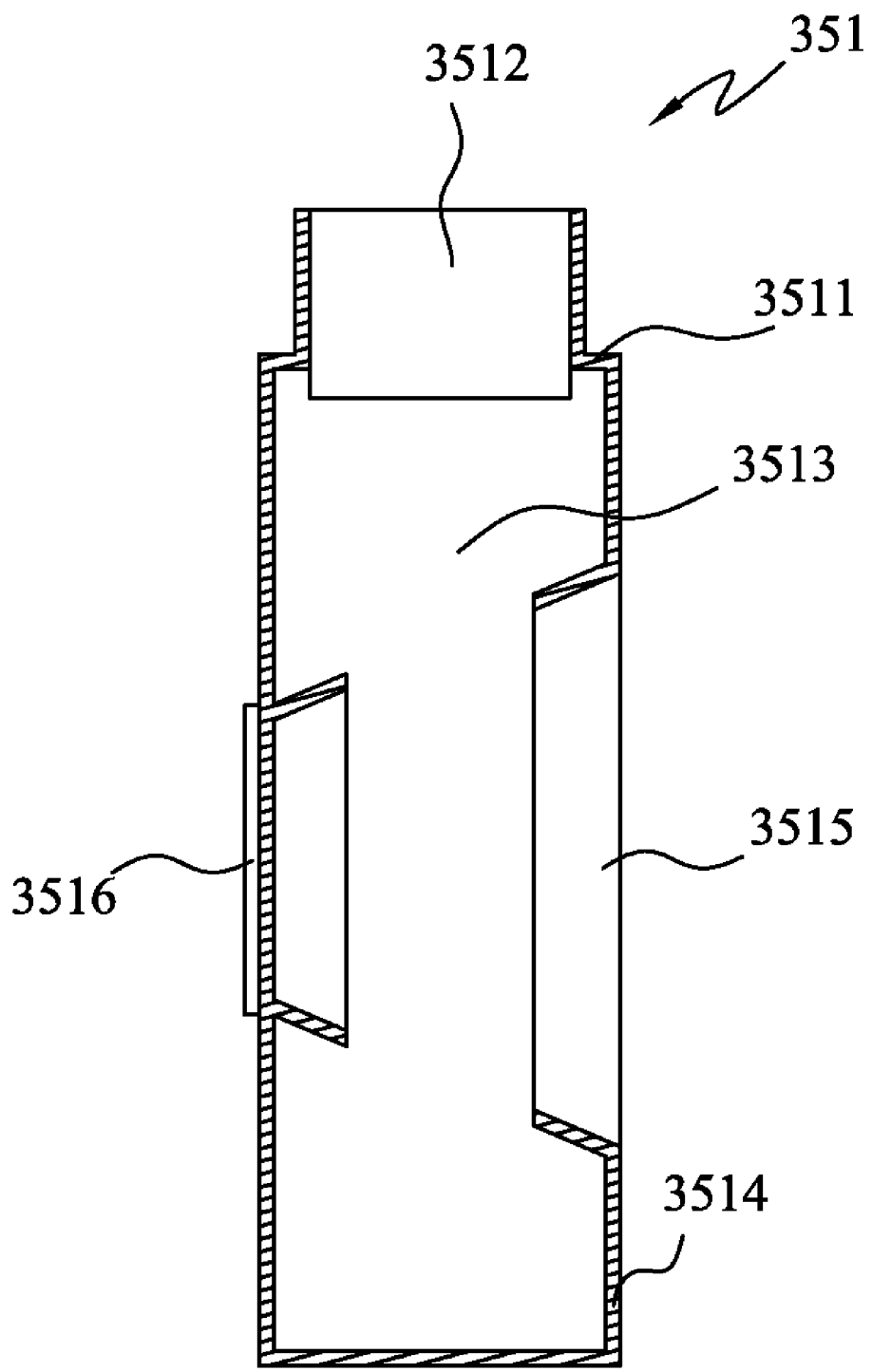
FIG. 4B is a side view of the air intake device of the preferred embodiment of this invention.

In reference to both FIGS. 4A and 4B, the air intake device 351 has a circular body 3511. The body 3511 further has a central axis 350 which is perpendicular to a vertical direction. The body 3511 defines an inner air chamber 3513, and is provided with an opening 3512 on a side edge thereof for communicating an exterior with the inner air chamber 3513, thereby to guide the cooling air flow generated by the cooling fan 33 into the inner air chamber 3513. Additionally, the body 3511 is formed with a mounting hole 3515 at a vertical sidewall 3514 thereof.

Figure 5A:
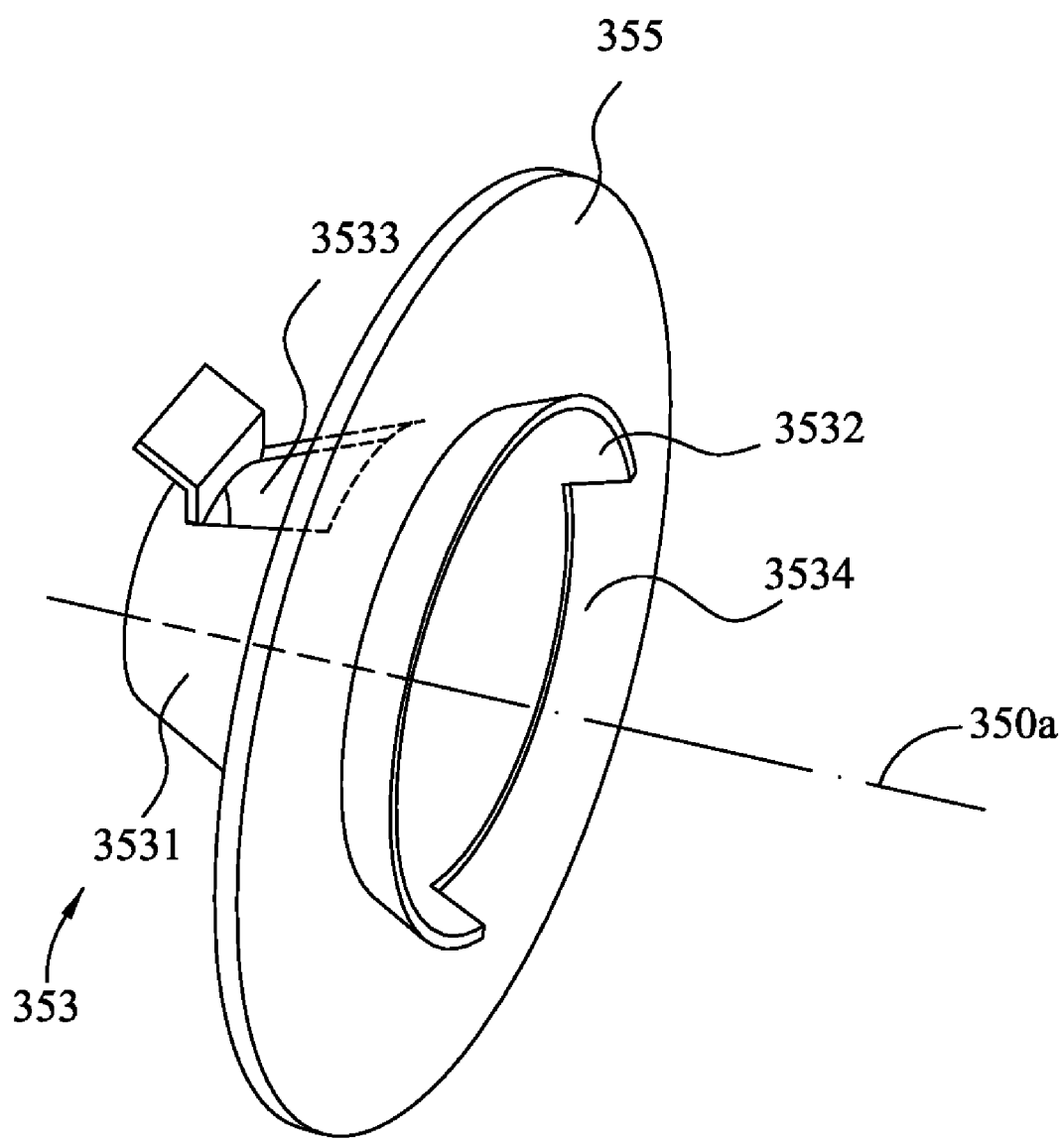
FIG. 5A is a perspective view of an adjustment apparatus and an adjustment plate of a preferred embodiment of this invention.
Figure 5B:
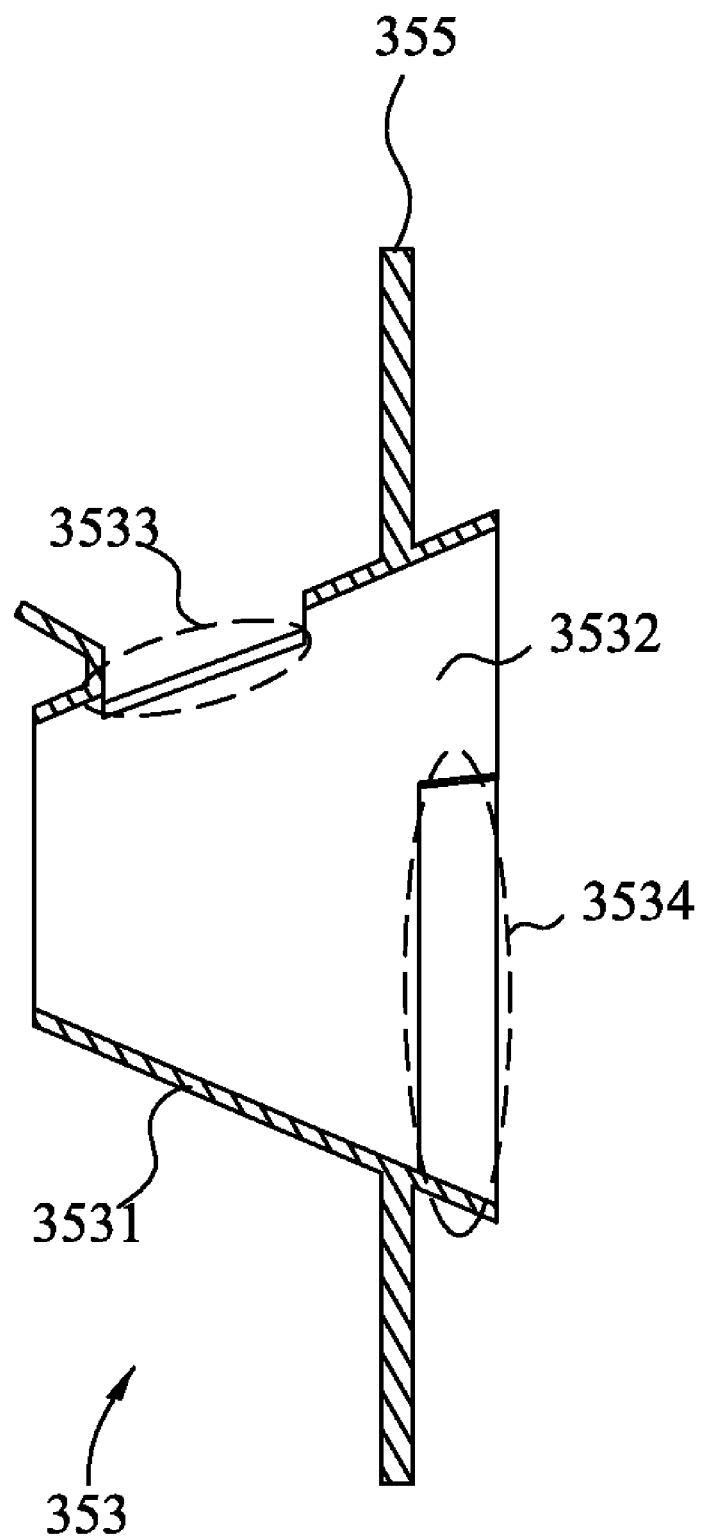
FIG. 5B is a side view of the adjustment apparatus and the adjustment plate of the preferred embodiment of this invention.

As shown in FIGS. 5A and 5B, the adjustment device 353 is substantially in a cone shape, and comprises an air-flow adjustment element 3531 and an air-flow guiding element 3532. The adjustment device 353 is adapted to be partially snap-fitted into the mounting hole 3515 of the air intake device 351 by means of the air-flow adjustment element 3531. The air-flow adjustment element 3531 is provided with an air-flow adjustment hole 3533 thereon. When the air-flow adjustment element 3531 extends from the mounting hole 3515 into the inner air chamber 3513 of the air intake device 351, a central axis 350a of the cone-shaped adjustment device 353 is substantially coincided with the central axis 350 of the body 3511. The air-flow guiding element 3532 extends outwards from the mounting hole 3515, and is formed with an arc opening 3534. The cooling air from the inner air chamber 3513 of the air intake device 351 flows through the air-flow adjustment hole 3533 into the adjustment device 353. The air-flow guiding element 3532 is adapted to guide the air flow from the air-flow adjustment element 3531 towards a specific direction through the arc opening 3534. In other embodiments, no limitation is made on the number and the locations of the arc opening 3534. For example, the arc openings 3534 may be formed at two opposite sides of the air-flow guiding element 3532, so that the cooling air flow is guided outwards from the two opposite sides and flows towards the lamp wick 311 along the two inner sidewalls of the lamp shade 313.

The adjustment plate 355 is annularly disposed on the adjustment device 353 to separate the air-flow adjustment element 3531 and the air-flow guiding element 3532, and adjoins the vertical sidewall 3514 of the body 3511. In an electrically or manually operated way, the adjustment plate 355 can drive the adjustment device 353 to rotate relatively to the air intake device 351 about the central axis 350. A reference scale (not shown) may be labeled at an outer edge of the adjustment plate 355 to show a degree to which the air-flow adjustment hole 3533 moves from a first position to a second position. Here, the reference scale is a reference for rotation angles. In other embodiments, the reference scale may also be in other units or be a self-defined label.

Figure 6A:
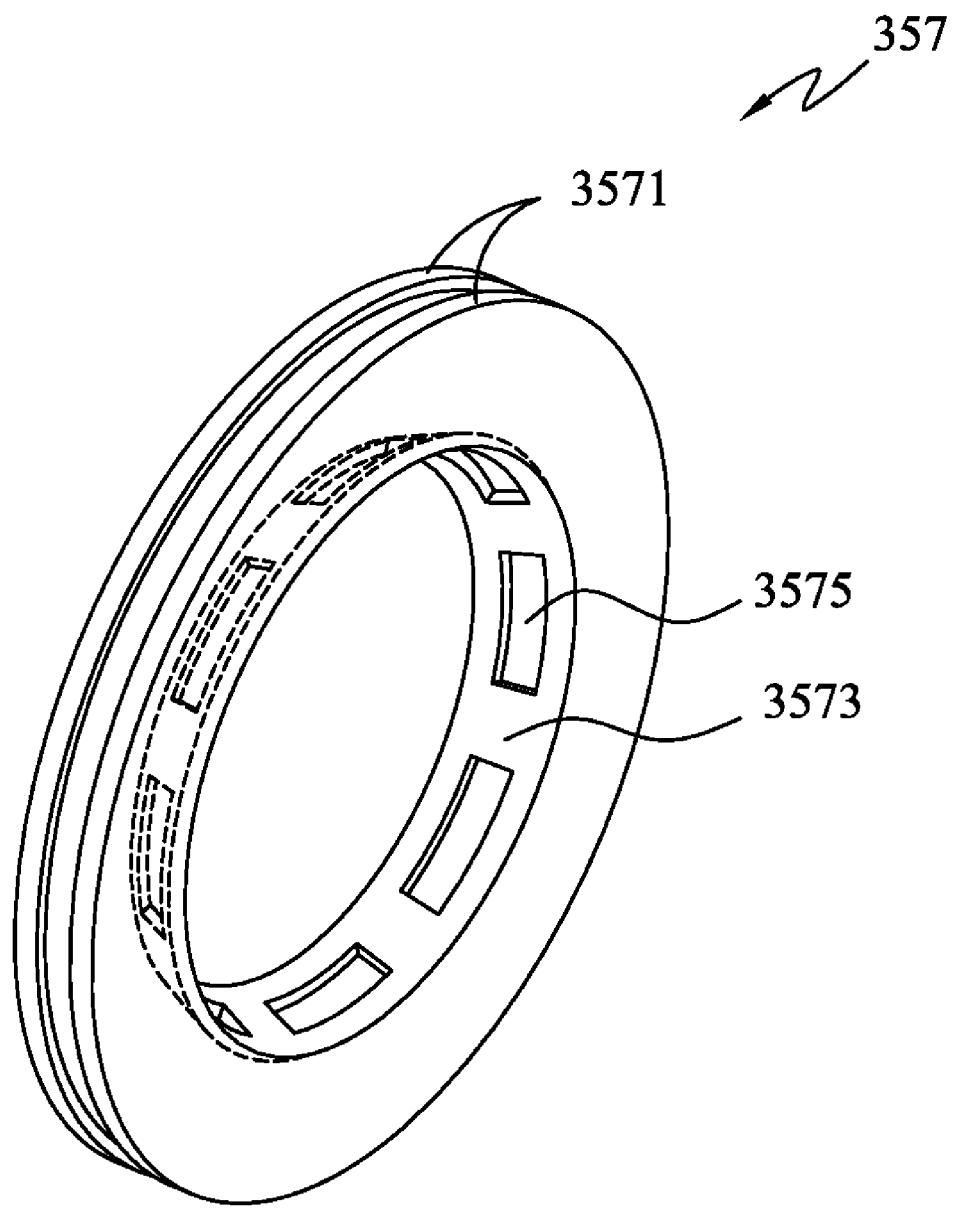
FIG. 6A is a perspective view of a receiving device of a preferred embodiment of this invention.
Figure 6B:
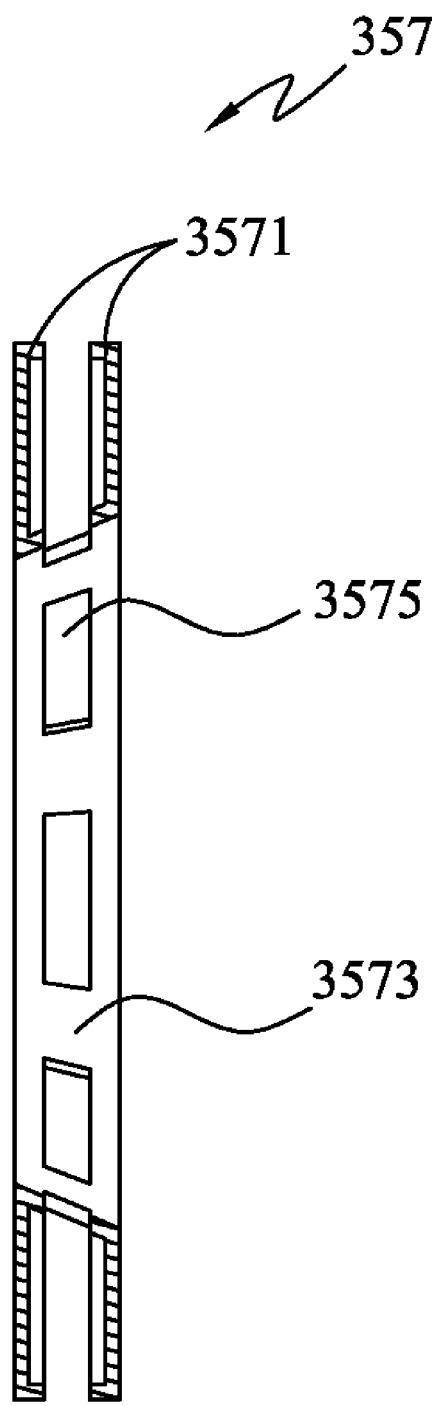
FIG. 6B is a side view of the receiving device of the preferred embodiment of this invention.

As shown in FIGS. 6A and 6B, the receiving device 357 is annularly disposed at an exterior of the air-flow guiding element 3532 and adjoins the adjustment plate 355. The receiving device 357, which is a circular shape, comprises two opposite receiving plates 3571 and a neck portion 3573 for connecting the two receiving plates 3571. The receiving device 357 is annularly disposed outside of the air-flow guiding element 3532 by means of the neck portion 3573. The neck portion 3573 has a plurality of air guiding holes 3575 thereon, so that the air flow passing through the arc opening 3534 is guided outwards through at least some of the plurality of air guiding holes 3575 corresponding to the arc opening 3534.

The guided air flow is adapted to flow into the lamp 31 and flow towards the lamp wick 311 along the inner sidewalls of the lamp shade 313, thereby to effectively cool the lamp wick 311 and the lamp 31 as a whole. The cooled air then flows outwards in another direction (e.g., opposite to the flow-in direction).

The cooling air from the cooling fan 33 is guided through the opening 3512 on the body 3511 of the air intake device 351 into the inner air chamber 3513, and then flows through the air-flow adjustment hole 3533 of the air-flow adjustment element 3531 into the adjustment device 353. After passing through the adjustment plate 355 to change the air flowing direction, the cooling air is guided from the air-flow guiding element 3532 to cool the lamp 31.

Figure 7A:
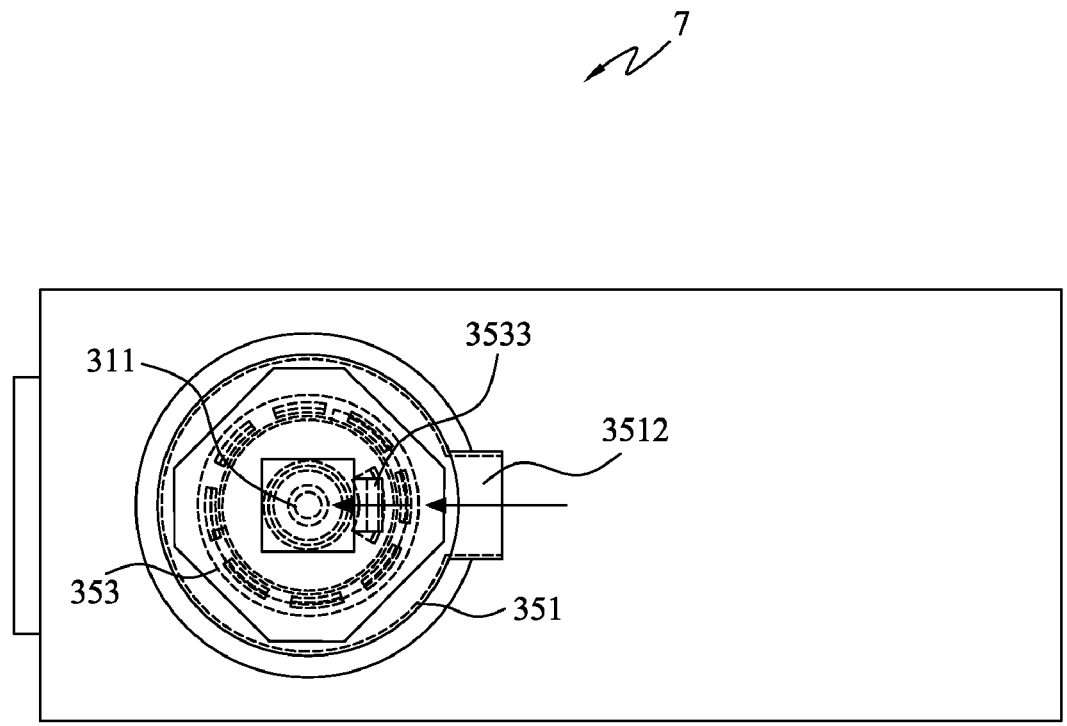
FIG. 7A is a diagram illustrating the cooling air flow direction of an illumination system of the preferred embodiment of this invention when installed in a certain orientation.
Figure 7B:
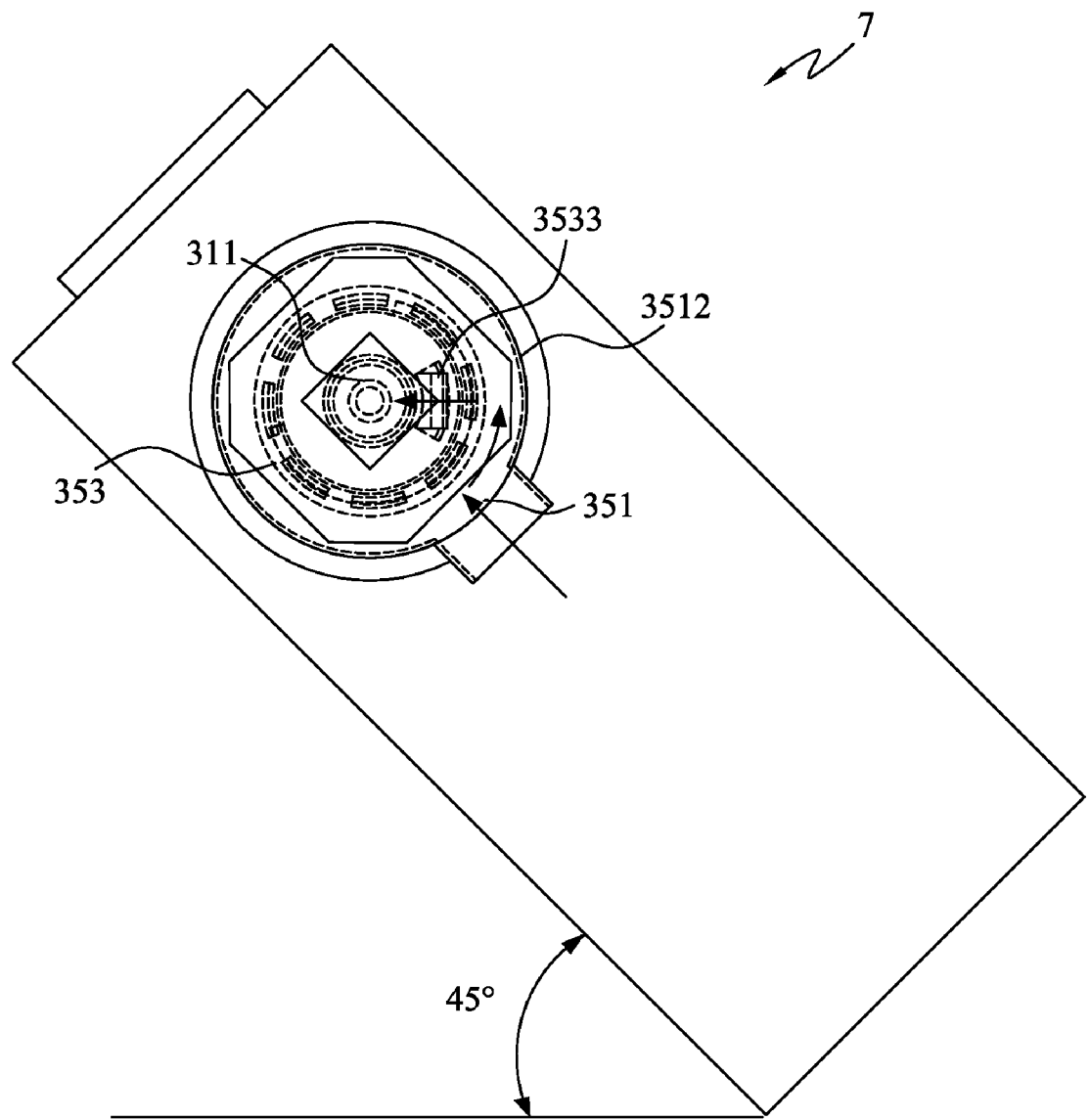
FIG. 7B is a diagram illustrating the cooling air flow direction of the illumination system of the preferred embodiment of this invention when installed in another orientation.

In this embodiment, when the projection apparatus 7 is disposed in a horizontal orientation (i.e., at a tilt angle of 0°), the air-flow adjustment hole 3533 is substantially aligned with the opening 3512, as shown in FIG. 7A. At this point, the air-flow adjustment hole 3533 is at the first position where the cooling air is allowed to flow sideways into the lamp wick 311. When the projection apparatus 7 is installed at an elevated angle of 45° between the projection direction of the lens and a level flat, the adjustment device 353 is adapted to move relative to the air intake device 351, such that the air-flow adjustment hole 3533 rotates from the first position to a second position constituting a substantial displacement with the opening 3512. The second position is adapted to include an angle of 45° with the first position, as shown in FIG. 7B. In this case, the cooling air can still flow sideways to the lamp wick 311.

Figure 7C:
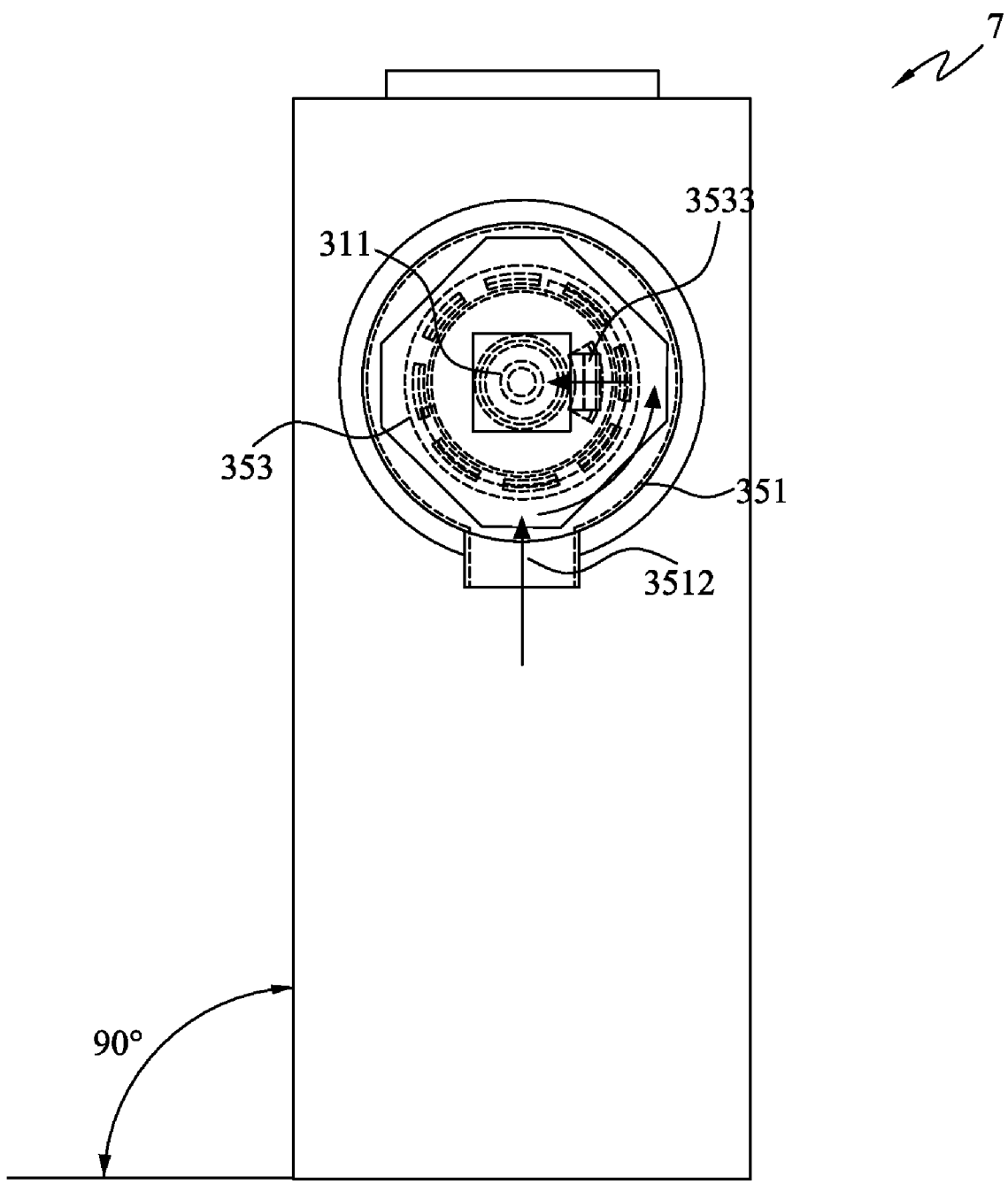
FIG. 7C is a diagram illustrating the cooling air flow direction of the illumination system of the preferred embodiment of this invention when installed in yet another orientation.
Figure 7D:
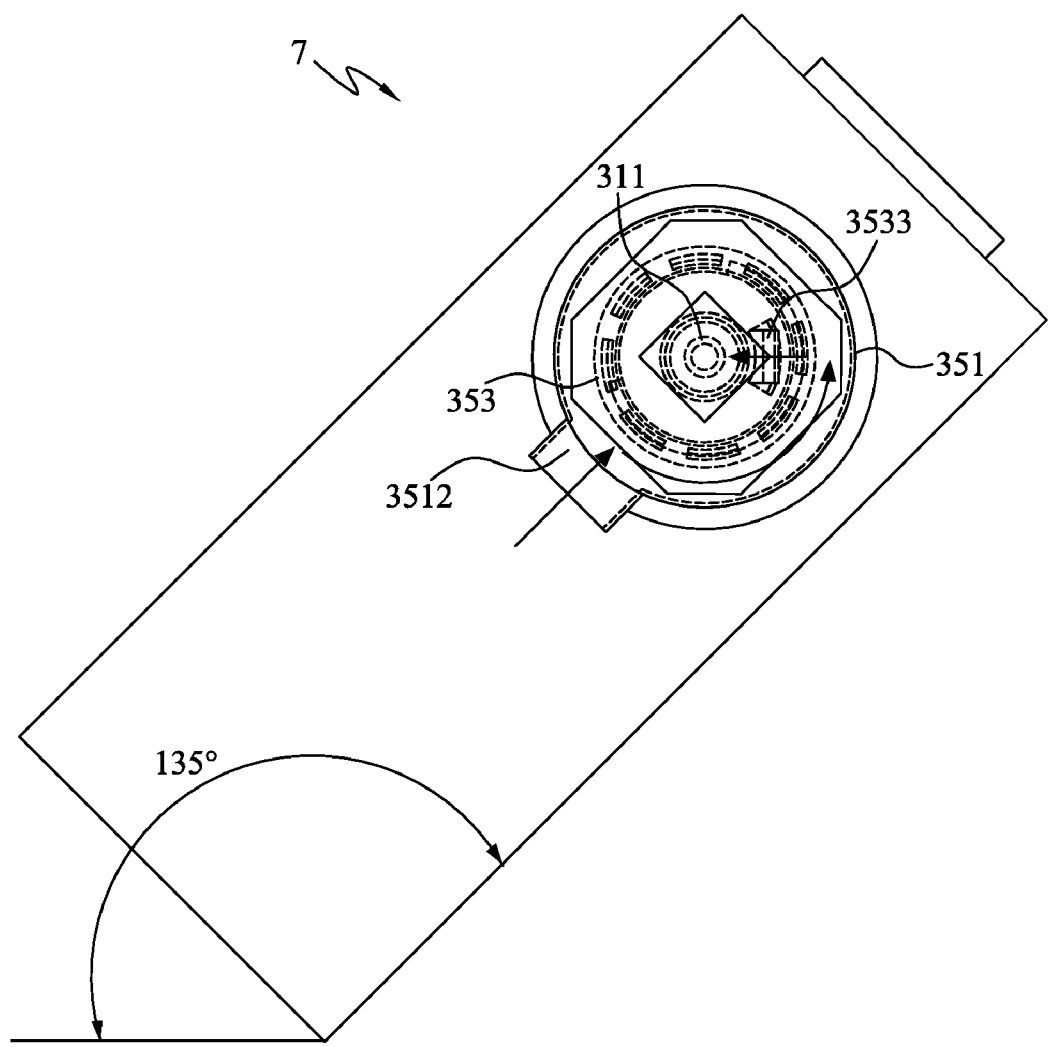
FIG. 7D is a diagram illustrating the cooling air flow direction of the illumination system of the preferred embodiment of this invention when installed in a further orientation.

As shown in FIG. 7C, when the projection apparatus 7 is installed at an elevated angle of 90° between the projection direction of the lens and the level flat, the adjustment device 353 is adapted to move relative to the air intake device 351, such that the air-flow adjustment hole 3533 rotates from the first position to a third position constituting a substantial displacement with the opening 3512. The third position is adapted to include an angle of 90° with the first position so the cooling air can still flow sideways into the lamp wick 311. Likewise, when the projection apparatus 7 is installed at an angle of 135° between the projection direction of the lens and the level flat, the adjustment device 353 is adapted to move relative to the air intake device 351, such that the air-flow adjustment hole 3533 rotates from the first position to a fourth position constituting a substantial displacement with the opening 3512. The fourth position is adapted to include an angle of 135° with the first position, as shown in FIG. 7D. In this case, the cooling air can still flow sideways into the lamp wick 311.

In other embodiments, the projection apparatus may further comprise a guiding fan, which is disposed adjacent to an air outlet side of the illumination system for drawing the cooled air outwards.

In conclusion, since this invention changes the air flowing direction in which the cooling air flows into the lamp shade by using an adjustment plate and an adjustment device, a projection apparatus utilizing this invention is allowed to be installed in any orientation. The air intake angle can be adjusted directly either manually or automatically in response to the tilting degree of the projection apparatus. Therefore, the projection apparatus as a whole can be actually cooled by the cooling air without being restricted by the air flowing direction and the internal elements thereof are allowed to operate normally at a normally operating temperature, thus avoiding the abnormal conditions caused by the rise in high temperature. In this way, the optimum direction of the cooling air flow is achieved, and the service life of the elements is prolonged.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A cooling air guiding apparatus adapted for a projection apparatus, comprising:
an air intake device, having:
a body defining an inner air chamber, the body being provided with an opening disposed at a side of the body for communicating an exterior with the inner air chamber, and the body being provided with a mounting hole formed at a vertical sidewall of the body; and
an adjustment device, having:
an air-flow adjustment element extending from the mounting hole into the inner air chamber, and an air-flow adjustment hole being formed on the air-flow adjustment element; and
an air-flow guiding element extending outwards from the mounting hole for guiding air in the air-flow adjustment element toward a specific direction;

wherein the adjustment device is adapted to move relatively to the air intake device about a central axis of the body, such that the air-flow adjustment hole is adapted to move from a first position being substantially aligned with the opening, to a second position constituting a substantial displacement with respect to the opening.

2. The cooling air guiding apparatus as claimed in claim 1, wherein the body of the air intake device is circular and is defined with the central axis, the adjustment device is substantially in a cone shape, and when the air-flow adjustment element extends from the mounting hole into the inner air chamber, a central axis of the adjustment device with the cone shape is substantially coincided with the central axis of the body.

3. The cooling air guiding apparatus as claimed in claim 1, further comprising an adjustment plate annularly disposed at the adjustment device to separate the air-flow adjustment element and the air-flow guiding element, and the adjustment plate being adjacent to the vertical sidewall of the body and driving the adjustment device to move relatively to the air intake device.

4. The cooling air guiding apparatus as claimed in claim 3, wherein the air-flow guiding element is formed with an arc opening for guiding the air flow in the air-flow adjustment element out therethrough.

5. The cooling air guiding apparatus as claimed in claim 4, further comprising a receiving device annularly disposed at an exterior of the air-flow guiding element and adjacent to the adjustment plate.

6. The cooling air guiding apparatus as claimed in claim 5, wherein the receiving device is circular and comprises two opposite receiving plates and a neck portion connecting the two receiving plates, the receiving device is annularly disposed outside of the air-flow guiding element by means of the neck portion, a plurality of air guiding holes are formed on the neck portion, and the air flow passing through the arc opening is guided out through at least part of the plurality of air guiding holes.

7. The cooling air guiding apparatus as claimed in claim 3, wherein the adjustment plate drives the adjustment device electrically or manually to move relatively to the air intake device.

8. The cooling air guiding apparatus as claimed in claim 3, wherein a reference scale is set at an outer edge of the adjustment plate to show a degree to which the air-flow adjustment hole moves from a first position to a second position.

9. The cooling air guiding apparatus as claimed in claim 8, wherein the reference scale is a reference for rotation angles.

10. An illumination system adapted for a projection apparatus, comprising:
   a cooling air guiding apparatus as claimed in claim 1;
   a lamp having a lamp wick and a lamp shade annularly disposed around the lamp wick, a front edge of the lamp shade corresponding to the air-flow guiding element; and
   a cooling fan for guiding a cooling air flow from the opening of the body into the inner air chamber, the cooling air flow passing through the air-flow adjustment hole of the air-flow adjustment element into the adjustment device and being guided out from the air-flow guiding element;
   wherein the adjustment device is adapted to move relatively to the air intake device about a central axis of the body.

11. The illumination system as claimed in claim 10, wherein the body of the air intake device is circular and is defined with the central axis, the adjustment device is substantially in a cone shape, and when the air-flow adjustment element extends from the mounting hole into the inner air chamber, a central axis of the adjustment device with the cone shape is substantially coincided with the central axis of the body.

12. The illumination system as claimed in claim 10, further comprising an adjustment plate annularly disposed at the adjustment device to separate the air-flow adjustment element and the air-flow guiding element, and the adjustment plate being adjacent to the vertical sidewall of the body and driving the adjustment device to move relatively to the air intake device.

13. The illumination system as claimed in claim 12, wherein the air-flow guiding element is formed with an arc opening for guiding the air flow in the air-flow adjustment element out therethrough.

14. The illumination system as claimed in claim 13, further comprising a receiving device annularly disposed at an exterior of the air-flow guiding element and adjacent to the adjustment plate.

15. The illumination system as claimed in claim 14, wherein the receiving device is circular and comprises two opposite receiving plates and a neck portion connecting the two receiving plates, the receiving device is annularly disposed outside of the air-flow guiding element by means of the neck portion, a plurality of air guiding holes are formed on the neck portion, and the air flow passing through the arc opening is guided out through at least part of the plurality of air guiding holes.

16. The illumination system as claimed in claim 12, wherein the adjustment plate drives the adjustment device automatically or manually to move relatively to the air intake device.

17. The illumination system as claimed in claim 12, wherein a reference scale is set at an outer edge of the adjustment plate to show a degree to which the air-flow adjustment hole moves from a first position to a second position.

18. The illumination system as claimed in claim 17, wherein the reference scale is a reference for rotation angles.

* * * * *